July 16, 1957  J. R. OISHEI  2,799,039
ADJUSTABLE WIPER ARM
Filed Dec. 1, 1953  2 Sheets-Sheet 1
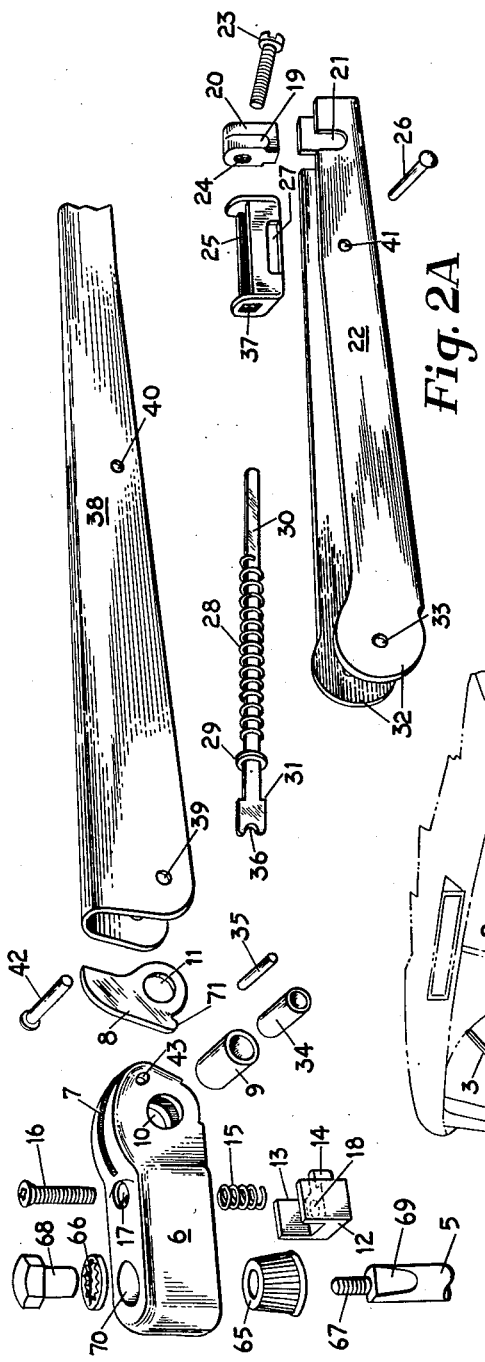
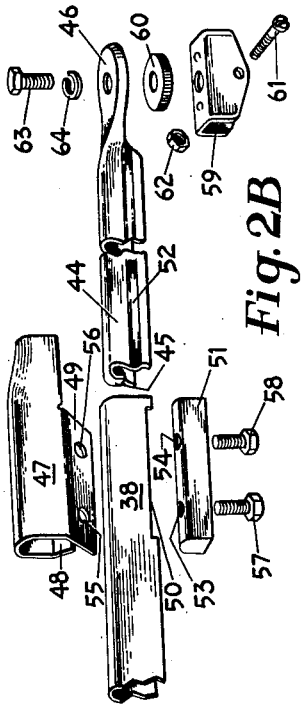
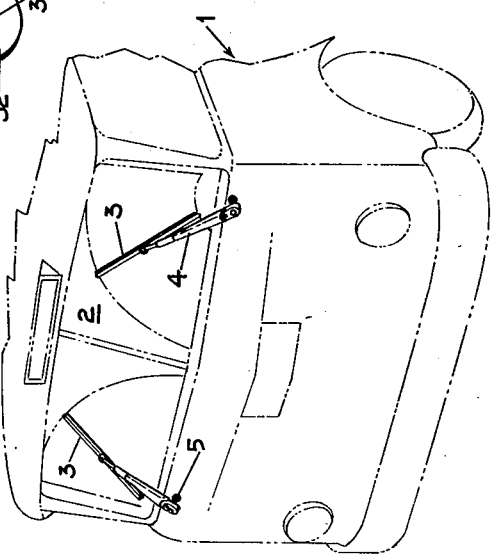
INVENTOR.
John R. Oishei
BY
Beau, Brooke, Buckley & Beau,
ATTORNEYS.

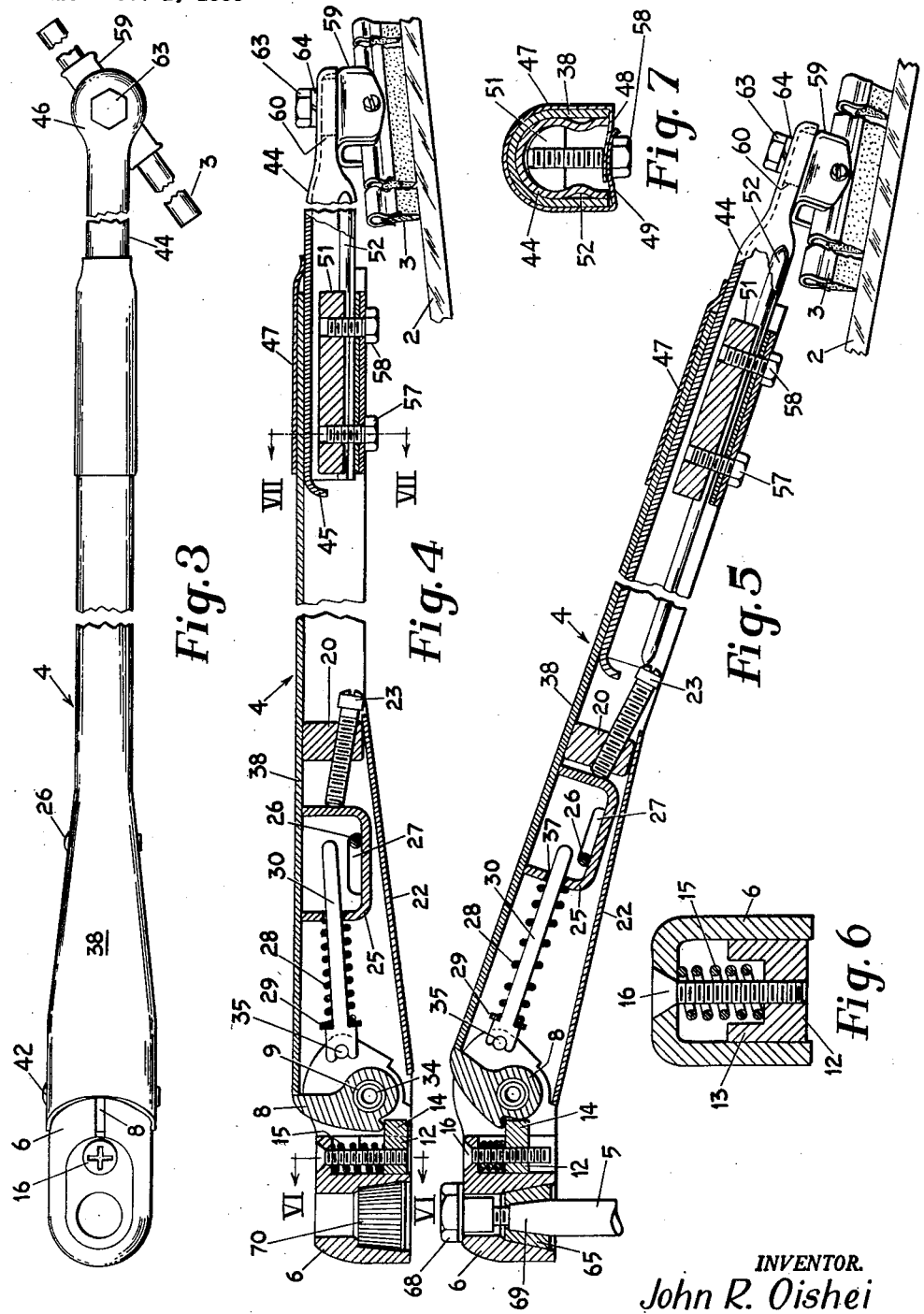

United States Patent Office 2,799,039
Patented July 16, 1957

2,799,039
ADJUSTABLE WIPER ARM

John R. Oishei, Buffalo, N. Y., assignor to Trico Products Corporation, Buffalo, N. Y.

Application December 1, 1953, Serial No. 395,355

5 Claims. (Cl. 15—255)

This invention relates to a windshield wiper for automotive vehicles, and more particularly to an adjustable wiper arm which may be adjusted to suit a multiplicity of different installations and adapted to meet varying operating conditions.

Automotive vehicles have for many years been manufactured to meet a variety of different needs with the result that many different types of vehicles have been developed, each suited to a particular purpose and environment. Because of the structural difference between these types, it has heretofore been necessary for owners of large fleets of vehicles to maintain an extensive variety of windshield wipers. This was made necessary by the fact that wiper arms of different dimensions were needed for the different types of vehicles. Further, the spring pressure on the arm necessary for the maintenance of proper contact between the squeegee and windshield varies with the operating conditions or environment in which the vehicle is employed. The large inventory of wiper arms heretofore required to meet the almost innumerable variety of conditions wherein a windshield wiper might be employed has resulted in an uneconomical and highly unsatisfactory situation for both the consumer and manufacturer.

Accordingly, it is the primary object of this invention to provide a single wiper arm which can be adjusted dimensionally to suit any specific installation, and wherein the spring pressure on the arm may be adjusted with facility to meet the prevailing operating conditions.

For a better understanding of this and other objects of the invention, reference is made to the following specifications and accompanying drawings wherein:

Fig. 1 is a diagrammatic view of an automotive vehicle equipped with windshield wiper arms constructed in accordance with the present invention;

Figs. 2A and 2B taken together form an exploded view of the wiper arm;

Fig. 3 is a front elevational view of the wiper arm;

Fig. 4 is a side elevational view, partly in section, of the wiper arm;

Fig. 5 is a view similar to Fig. 4, but illustrating the parts in a different position;

Fig. 6 is a view taken along line VI—VI of Fig. 4 looking in the direction of the arrows; and, Fig. 7 is a view taken along VII—VII of Fig. 4 looking in the direction of the arrows.

Referring now more particularly to the drawings, the numeral 1 generally designates an automotive vehicle having a windshield 2 and squeegees 3. Arms 4 join the squeegees to rock-shafts 5 which are connected to the wiper motor, not shown, in the conventional manner.

The head 6 of the wiper arm is sliced at 7 for the reception of adjustable stop plate 8. The dimensions of the slice are such that the stop plate may rotate freely upon bushing 9 which passes through mating holes 10 and 11 in the head and stop plate respectively.

The adjustment slide 12 having vertical shoulders 13 and a horizontal tongue 14 is assembled with helical spring 15 in an opening provided therefor in the lower surface of the head. Screw 16 is passed through a countersunk hole 17 in the upper surface of the head and threaded into tapped hole 18 in the adjustment slide so as to be concentric with spring 15. As a result, the spring is compressed between the head and the slide so as to urge the slide and screw 16 downward. Since rotation of the slide is prevented by the side walls of the head, rotation of the screw causes a vertical movement of the slide with the screw being held firmly in place by spring 15.

Shoulders 19 of the adjustment nut 20 are engaged in guideways 21 cut in the sides of the U-shaped reinforcing shell 22 so as to prevent longitudinal movement, while screw 23 is threaded into tapped hole 24 of the nut. Spring 28 and washer 29 are assembled on spring guide 30 which is enlarged at one end to provide shoulders 31. Ears 32 of the reinforcing shell are passed over head 6 so as to align holes 33 in the ears with holes 10 in the head, the latter already containing bushings 9 and 34. The enlarged portion of spring guide 30 is inserted in slice 7 and pivoted on pin 35 via arcuate socket 36 while the opposite end of the guide is inserted in perforation 37 in bracket 25 so as to compress spring 28 between the bracket and shoulders 31, with washer 29 providing a bearing surface for the spring. The wiper arm retainer 38 is telescoped over reinforcing shell 22 so as to align holes 39 and 40 of the retainer with holes 33 and 41 of the shell. Rivet 42 is passed through holes 39 and 33 and the interior of bushing 34 so as to connect the head, reinforcing shell 22 and retainer 38. Pivot pin 35 is prevented from moving out of holes 43 in the head by the side walls of the retainer. Rivet 26 is passed through holes 40 of the retainer and holes 41 of the shell to prevent relative rotation between these members. The rivet is also passed through cut-outs 27 of bracket 25 which is located interiorly of the shell. The vertical dimensions of the bracket and adjustment nut 20 are such that their top surfaces abut retainer 38 after assembly so as to prevent any rotation or tilting of these elements.

The adjustable arm extension 44 is substantially U-shaped with an inturned tongue 45 at one end and a hollow disclike socket 46 at the opposite end. Clamp 47 is wrapped about retainer 38 with the overlapping leaves 48 and 49 lying in the undercut portion 50 of the retainer so as to present an uninterrupted undersurface. Wedge block 51 is placed interiorly of the arm extension 44 proximate to tongue 45 and is held suspended in this position by the longitudinal ribs 52 of the arm extension. The entire assemblage is then telescoped within the retainer until the tapped holes 53 and 54 of the block are lined up with perforations 55 and 56 in the leaves of clamp 47. Screws 57 and 58 are then passed through the perforations and threaded into the holes in the block, firmly wedging it against the ribs of the arm extension so as to urge the sides of the latter into tight engagement with the interior of the retainer. As the clamp is formed of a much thinner gauge material than either the retainer or extension, the tightening of the screws tends to deform it so as to urge its sides inwardly against the exterior of the retainer. The entire assemblage is as a result clamped sufficiently tightly together to prevent any relative movement of the parts. In the event that it is desired to shorten the longitudinal dimension of the assembled arm, it is merely necessary to loosen screws 57 and 58 and telescope extension 44 further into retainer 38 as is illustrated in Figs. 4 and 5. Conversely, if it is desired to increase the longitudinal dimension, extension 44 may be partially withdrawn from its telescoped position, tongue 45 acting as a positive stop to prevent complete withdrawal. It should be obvious that an infinite range of incremental adjustments are attainable between the two extreme positions illustrated.

Clip 59 is welded to knurled washer 60 so as to form an integral unit which is attached to the arm extension by screw 63 and lock washer 64, knurled washer 60 being located interiorly of socket 46. The serrations on the periphery of washer 60 grasp the walls of the socket so as to prevent any inadvertent relative rotation. Squeegee 3 is then attached to the clip by screw 61 and nut 62. In the event that it is desired to change the angle between the axes of the arm and squeegee, it is merely necessary to loosen screw 63, rotate washer 60 until the squeegee is at the desired angle, and then retighten the screw.

The assembled arm is connected to the rockshaft 5 by means of tapered driver 65. The shaft is tapered at 69 to present a squared cross-section which mates with a comparable opening in the driver, threaded extension 67 of the shaft extending through the opening. Nut 68 and its associated lock washer 66 are employed to draw the shaft and driver into a tight driving engagement with tapered hole 70 in the head, the serrations on the driver meshing with similar serrations in the hole.

As spring guide 30 is pivoted about pin 35, which is supported by head 6, and as a retainer 38 rotates about bushing 9 which is below the pin, spring 28 when in a compressed condition will exert a clockwise moment on the arm urging the wiper into contact with windshield. Utilization of a compression spring for this purpose in place of the tension spring employed heretofore has several advantages. With the compression spring there is no need for hooked or formed ends of the type necessary for securing a tension spring in place. As a result, not only is there a substantial saving in the cost of manufacture, but the modification also permits a more compact and efficient product by eliminating the space previously occupied by the formed spring ends. Additionally, all forces are exerted in an axial direction. The spring and guide are no longer subject to transverse forces and the excessively high sliding friction resulting therefrom. Since the magnitude of the moment is determined by the degree of compression of the spring, the desired pressure between the squeegee and windshield may be attained by varying the compression. This is accomplished by the manipulation of screw 23. As movement of adjustment nut 20 is prevented by the engagement of shoulders 19 in guideways 21, rotation of the screw will result in its travelling axially through tapped hole 24. The motion of the screw is transmitted to bracket 25, a limited longitudinal movement of which is permitted by cut-outs 27 and rivets 26. As the spring is compressed between bracket 25 and shoulders 31 of spring guide 30, any movement of the bracket by screw 23 between the extreme positions illustrated in Figs. 4 and 5 will change the compression of the spring and therefore the contact pressure between the squeegee and the windshield.

Because of the curved configuration of windshields now in common use, the squeegee rises and falls in a direction perpendicular to the shield as it moves through its wiping arc. As the squeegee rises and falls, the compression of the spring varies correspondingly. However, as is shown in the drawings, pin 35, about which the spring guide is pivoted, is mounted above and outboard of the bushing 9 on which the retainer is pivoted. Therefore, when the retainer rotates in a clockwise direction so as to ease the compression of the spring, the effective lever arm will compensatorily increase in magnitude. Conversely, when the retainer moves in a counterclockwise direction so as to increase the compression on the spring, the effective lever arm will simultaneously decrease in magnitude. It may therefore be seen that within the operating range of the wiper, the moment on the retainer will remain substantially constant for any given setting of screw 23 regardless of the movement of the retainer with respect to the head.

However, because of the necessity of permitting the retainer to rise and fall in conformance to the contour of the shield immobilely attaching the retainer to the head is not possible, and means must be provided to prevent excessive wind induced movement between these members. If the vehicle is being operated at a high velocity, the wind tends to lift the wiper off the shield against the pressure of spring 28. Stop plate 8 is utilized to prevent this wind lift without in any way affecting the rise and fall of the squeegee. After its installation, the squeegee is moved to its point of maximum rise. Screw 16 is then rotated so as to draw adjustment slide 12 upward until tongue 14 engages cam surface 71 of stop plate 8. Subsequent movement of the slide results in rotation of the plate about bushing 9 until the forward edge of the plate engages the end of retainer 38. As the adjustment is made at the point of maximum rise of the squeegee, the plate will present a positive stop against wind lift without in any way affecting the resilient rise and fall of the squeegee as it moves across the shield. A sufficient range of adjustment of slide 12 is provided so as to permit the utilization of the stop plate regardless of whether the vehicle has a vertical shield as in Fig. 4 or one that slopes as in Fig. 5.

It may therefore be seen that by utilizing the instant invention, a highly versatile wiper arm of a single design may be utilized for a multiplicity of different installations. Not only may the axial dimension of the arm and the angle between the arm and squeegee be changed with facility, but also the spring pressure may be adjusted to any desired value. Further, because of the adjustable stop plate the arm may be utilized on any windshield regardless of whether it is flat or curved, or vertical or sloping.

Having thus disclosed an exemplary embodiment thereof, what I claim as my invention is:

1. A wiper arm for an automotive vehicle having a windshield and a rockshaft comprising, a head adapted to be operatively mounted on the rockshaft, a retainer pivotally mounted on the head, resilient means extending between said retainer and said head for urging the retainer toward the windshield, and a stop carried by said head for positively limiting the distance which the retainer may be moved away from the windshield, said retainer being freely movable between the limits defined by the windshield and by said stop, and said stop being adjustable to selectively vary the limit of movement defined thereby.

2. A wiper arm for an automotive vehicle having a windshield and a rockshaft comprising, a head adapted to be operatively mounted on the rockshaft, a retainer pivotally mounted on the head, resilient means for urging the retainer toward the windshield, an arm extension telescoped within the retainer for lengthwise movement relative thereto, and means adapted to clamp said retainer and said extension together in adjusted position for preventing relative movement between the retainer and arm extension.

3. A wiper arm for an automotive vehicle having a windshield and a rockshaft comprising, a head adapted to be operatively mounted on the rockshaft, a retainer pivotally mounted on the head, a guide bearing against said head, a compression spring carried by said guide and bearing thereagainst and against said retainer for urging the retainer toward the windshield, means for adjusting the amount of compression of the spring, said spring exerting force on the guide and retainer only in a direction substantially axial of said guide, an adjustable positive stop for limiting the distance which the retainer may be moved away from the windshield.

4. A wiper arm for an automotive vehicle having a windshield and a rockshaft comprising, a head adapted to be operatively mounted on the rockshaft, a retainer pivotally mounted on the head, a shouldered guide pivoted on said head outwardly of and above the pivotal connection between said head and said retainer, a part carried by said retainer for slidably receiving said guide, a compression spring surrounding said guide and bearing against the shoulder thereof and against said part for urging the retainer toward the windshield, and means adjustably positioning said part lengthwise of said retainer for adjusting the amount of compression of the spring, said spring exerting force on the guide and retainer only in a direction substantially axial of said guide.

5. In a windshield wiper arm assembly including a head mountable on the end of a rockshaft, a retainer pivotaly connected to the head for arcuate movement in a plane including the axis of the rockshaft, and resilient means arranged between the head and the retainer for resisting said arcuate movement; an adjustable stop plate pivotally connected to said head and having one end thereof in abutment with said retainer, an adjustment slide arranged in said head and having a tongue adapted for abutment with said stop plate to prevent pivotal movement of the stop plate in one direction, and adjustment means for adjusting the relative position of the slide with respect to the stop plate.

References Cited in the file of this patent

UNITED STATES PATENTS

| | | |
|---|---|---|
| 2,087,178 | Zaiger | July 13, 1937 |
| 2,230,596 | Horton | Feb. 4, 1941 |
| 2,245,244 | Zaiger | June 10, 1941 |
| 2,290,140 | Anderson | July 14, 1942 |
| 2,557,755 | Nesson | June 19, 1951 |
| 2,642,612 | Smulski | June 23, 1953 |